US009249929B2

(12) United States Patent
Callif et al.

(10) Patent No.: US 9,249,929 B2
(45) Date of Patent: Feb. 2, 2016

(54) ADJUSTABLE HANGING DEVICE

(71) Applicant: LIBERTY HARDWARE MFG. CORP., Winston-Salem, NC (US)

(72) Inventors: Adam Callif, Chicago, IL (US); Jessina Collins, Chicago, IL (US); James Leroy Daniels, Stokesdale, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 0 days.

(21) Appl. No.: 14/257,356

(22) Filed: Apr. 21, 2014

(65) Prior Publication Data
US 2015/0300559 A1 Oct. 22, 2015

(51) Int. Cl.
  *A47G 1/16* (2006.01)
  *F16M 13/02* (2006.01)
  *F16B 5/02* (2006.01)

(52) U.S. Cl.
  CPC ............ F16M 13/022 (2013.01); F16B 5/0225 (2013.01); *A47G 1/16* (2013.01)

(58) Field of Classification Search
  CPC ......... A47G 1/16; A47G 1/24; A47G 1/1686; A47G 1/20; A47G 1/22; A47B 96/062; G02B 7/1825; B60R 1/06
  See application file for complete search history.

(56) References Cited

U.S. PATENT DOCUMENTS

| | | | |
|---|---|---|---|
| 2,263,901 A * | 11/1941 | Olney | 248/496 |
| 2,757,890 A | 8/1956 | Sutton et al. | |
| 3,063,666 A | 11/1962 | Morrison | |
| D282,525 S | 2/1986 | Samson et al. | |
| 4,728,237 A | 3/1988 | Lorincz et al. | |
| 4,871,140 A | 10/1989 | Hoskinson et al. | |
| 4,892,284 A | 1/1990 | Kelrick | |
| 5,069,411 A * | 12/1991 | Murphy | 248/476 |
| 5,342,014 A * | 8/1994 | Wilson | 248/476 |
| 5,588,629 A | 12/1996 | Barnes | |
| 8,011,635 B2 | 9/2011 | Aleo | |
| 8,376,308 B2 | 2/2013 | Greve | |
| 8,398,048 B2 | 3/2013 | Popkin et al. | |
| 8,864,095 B1 * | 10/2014 | Marks | 248/495 |

FOREIGN PATENT DOCUMENTS

| | | |
|---|---|---|
| DE | 4204423 A1 | 8/1993 |
| FR | 2343454 A1 | 10/1977 |
| GB | 2395123 A | 5/2004 |

* cited by examiner

*Primary Examiner* — Casandra Davis
(74) *Attorney, Agent, or Firm* — Brooks Kushman P.C.; Lora Graentzdoerffer

(57) ABSTRACT

A device to hang articles includes a first member defining a first elongate slot and adapted to be affixed to a mounting surface, and a second member defining a second elongate slot and oriented generally perpendicular to the first member. The second member defines a hook disposed near an end of the second member. The device also includes a threaded screw protruding through the first elongate slot and the second elongate slot, and a retaining nut in engagement with the threaded screw to clamp the first member and the second member thereby securing a relative position between the first member and the second member.

15 Claims, 3 Drawing Sheets

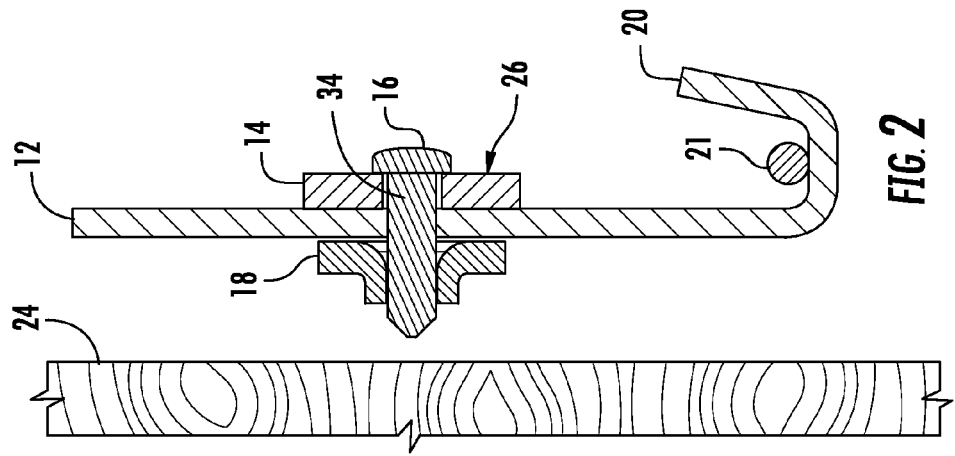
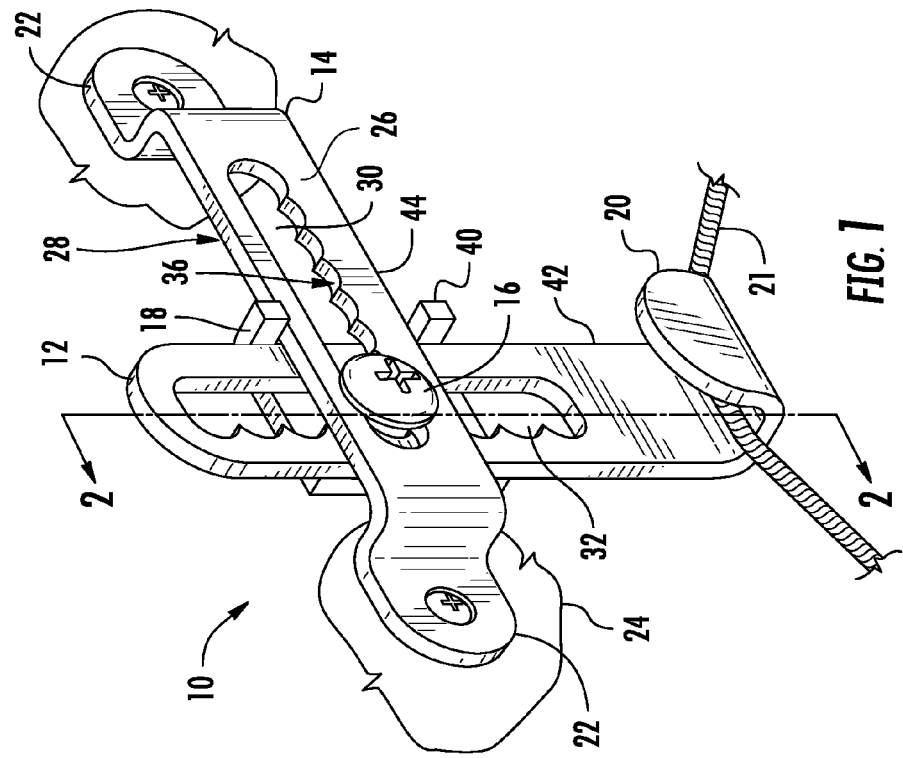

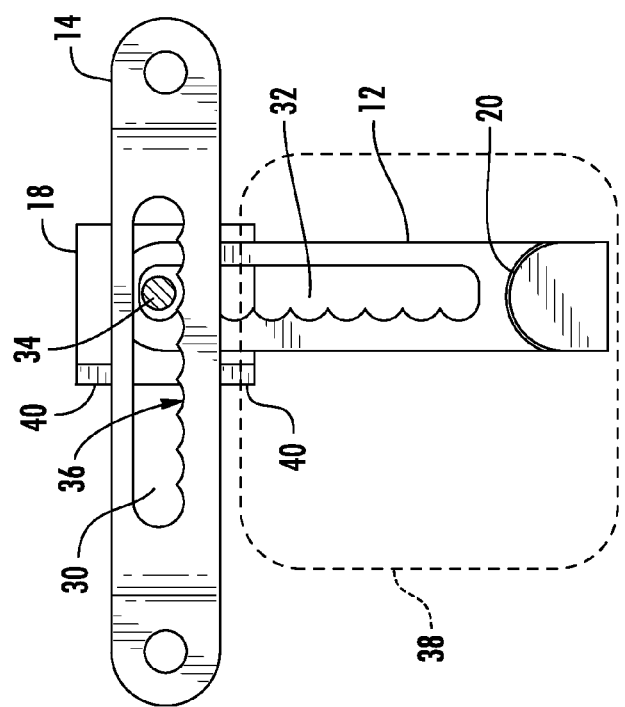
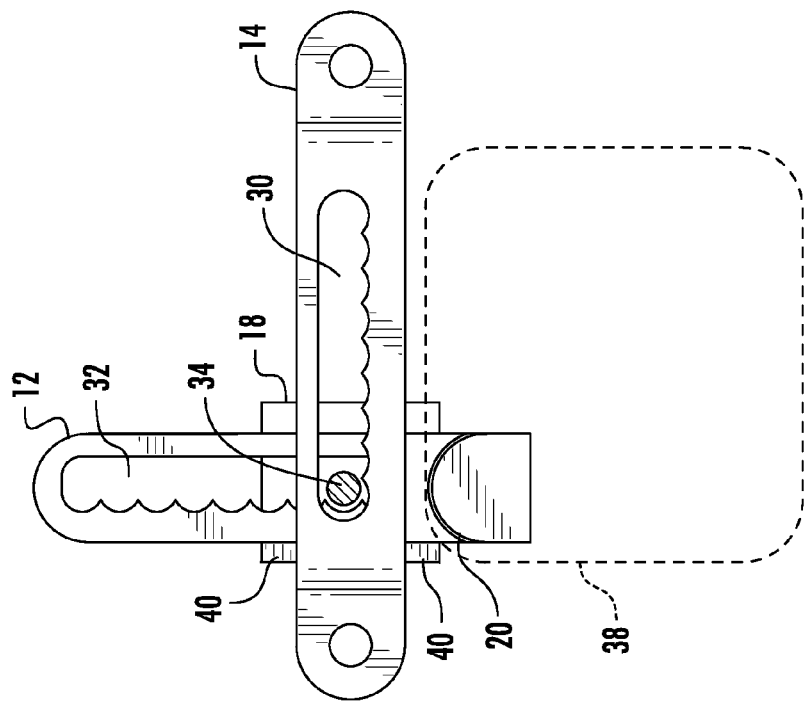

ADJUSTABLE HANGING DEVICE

TECHNICAL FIELD

The present disclosure relates to an adjustable device for hanging articles.

BACKGROUND

Hanging articles on a mounting surface such as a wall generally includes affixing a hanging device to the wall, and then positioning the article to be suspended from the device. Often this requires accounting for the dimensions of the article and the position of the article's edges relative to its hanging feature. A difficulty arises when dimensions are mis-measured or mis-calculated. The result may be that the final hanging position of the article is not the actual position desired by the user. One remedy is to remove the hanging device from the wall, and re-attach it at a different position. This can be cumbersome, as well as result in unnecessary damage to the wall.

SUMMARY

In at least one embodiment, a device to hang articles includes a first member defining a first elongate slot and adapted to be affixed to a mounting surface, and a second member defining a second elongate slot and oriented generally perpendicular to the first member. The second member includes a hook disposed near an end of the second member. The device also includes a threaded screw protruding through the first elongate slot and the second elongate slot, and a retaining nut in engagement with the threaded screw to clamp the first member and the second member thereby securing a relative position between the first member and the second member.

In at least one embodiment, a device to hang articles includes a generally horizontal first elongate member capable of being affixed to a mounting surface, and a generally vertical second elongate member slidably retained to the first elongate member and having a hook disposed near an end. The device also includes a threaded screw protruding through both of the first elongate member and the second elongate member. A retaining nut is adapted to cooperate with the threaded screw to apply a clamp load to restrict relative movement between the first elongate member and the second elongate member.

In at least one embodiment, a device to hang articles includes a mounting member defining a first elongate slot therethrough and capable of being affixed to a mounting surface, and a hook member defining a second elongate slot oriented generally perpendicular to, and overlapping the first elongate slot. The device also includes a securing screw protruding through both of the first elongate slot and the second elongate slot, and a retaining nut configured for selective engagement with the securing screw. At least one of the first elongate slot and the second elongate slot further defines an edge having at least one notch sized to receive a shank of the securing screw therein.

In additional embodiments, a device for hanging articles may include a series of notches disposed in increments along an edge of at least one of elongate slot such that a shank of a securing screw may be selectively positioned along the increments.

In further additional embodiments, a tightening of a securing screw relative to a retaining nut may increase a clamp load thereby restricting relative movement between the mounting member and the hook member. Also, a loosening of the securing screw relative to the retaining nut may decrease the clamp load thereby allowing relative movement between the hook member and the mounting member.

BRIEF DESCRIPTION OF THE DRAWINGS

FIG. 1 is a perspective view of a hanging device assembly.

FIG. 2 is a cross-sectional view along line 2-2 of the hanging device assembly of FIG. 1.

FIG. 4 is a view of a first selectable position of a hanging device assembly.

FIG. 5 is a view of a second selectable position of a hanging device assembly.

DETAILED DESCRIPTION

Figure 3:
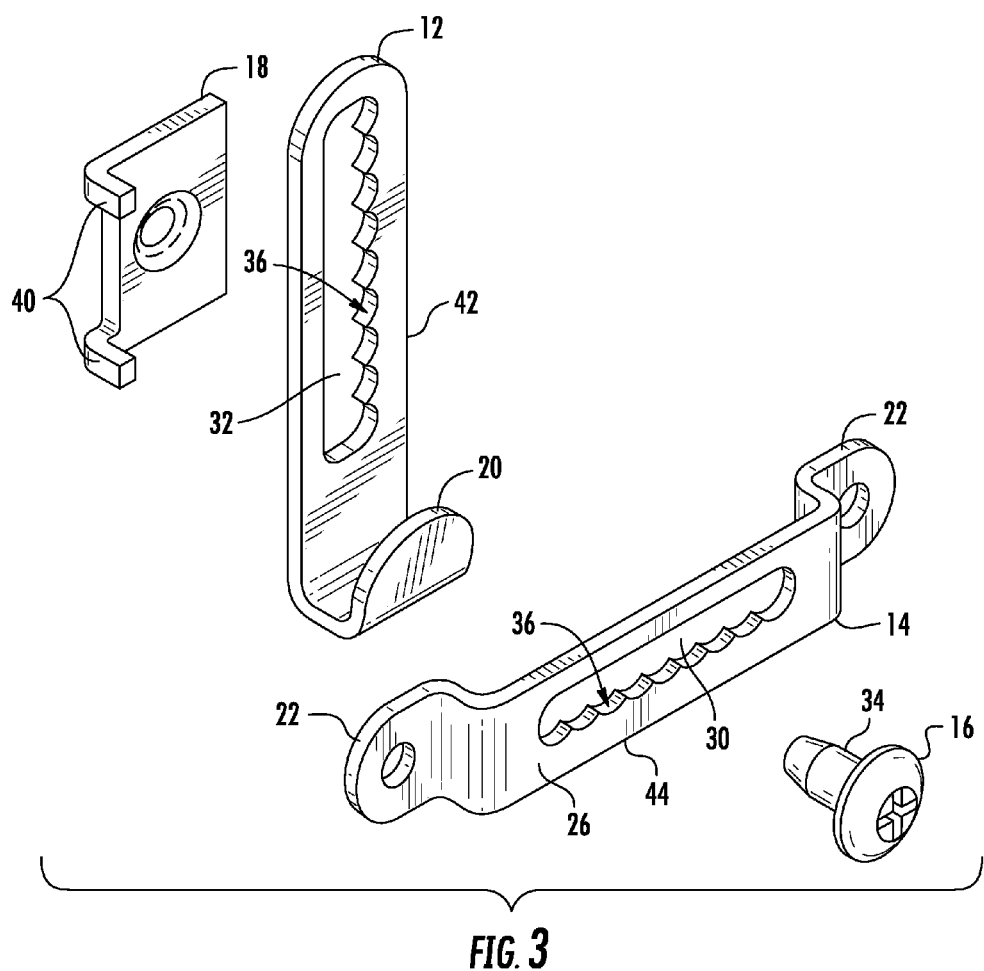
FIG. 3 is an exploded view of the hanging device assembly of FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 1 through 3, an adjustable article hanging assembly 10 is provided. The hanging assembly 10 includes a hook member 12 and a mounting member 14. The hook member 12 is secured to the mounting member 14 by a threaded securing screw 16 and a retaining nut 18. The hook member 12 is a generally vertical elongate member and includes a hook feature 20 at one end for receiving an article 21 to be hung. In at least one embodiment, the hook member 12 is a generally flat body having a curved hook at a lower end. The hook member 12 may be formed from a sheet material, for example by stamping sheet metal.

The mounting member 14 is a generally horizontal elongate member and includes a pair of mounting pads 22 near opposing ends. The mounting pads 22 include surfaces that are coincident in a mounting plane such that the mounting pads 22 can be positioned flatly against a mounting surface 24, such as a wall. The mounting pads 22 may be affixed to the mounting surface 24 using screws, nails, or other fasteners through each of the mounting pads 22. Also, wall anchors may be installed in the mounting surface 24 to secure the mounting member 14 to drywall or brick surfaces for example.

The hook member 12 is selectively secured to the mounting member 14 by way of a threaded joint. The securing screw 16 protrudes through both of the hook member 12 and the mounting member 14 and is received by the retaining nut 18 on an opposing side of the hook member 12 and the mounting member 14. The securing screw 16 and the retaining nut 18 are both threaded and cooperate to impart a clamp load across both of the hook member 12 and the mounting member 14. The clamp load compresses the respective parts in an inner layer of the threaded joint in order to secure a relative position between the hook member 12 and the mounting member 14. Generally, tightening the securing screw 16 relative to the retaining nut 18 increases the clamp load, thereby restricting relative movement between the hook member 12 and the mounting member 14. Conversely, loosening the securing screw 16 relative to the retaining nut 18 decreases the clamp load thereby allowing a relative movement between the hook member 12 and the mounting member 14. Once the clamp load of the securing screw 16 is less than a threshold, a relative slip between the hook member 12 and the mounting member 14 is enabled. Although a screw and nut combination is disclosed herein, it is contemplated that alternative fastening arrangements may be used to secure the relative position of the hook member against the mounting member.

An offset surface 26 is disposed between, and interconnects the mounting pads 22. The offset surface 26 is positioned at a distance away from the mounting plane so as to create a gap 28 between the mounting surface 24 and the offset surface 26. The retaining nut 18 may be positioned in the gap 28 and allowed to slide along the mounting member 14. Additionally, the hook member may also be positioned within the gap defined by the offset surface. In at least one embodiment the mounting member includes two mounting pads 22. It is contemplated that alternative embodiments may include three or more mounting pads, for example to enhance strength and stability of the mounting member 14.

The mounting member 14 is provided with a first elongate slot 30 through the offset surface 26. The securing screw 16 is capable of selectable positioning along a length of first elongate slot 30. The selectable screw position in turn allows the hook member 12 to be adjusted along a longitudinal direction of the first elongate slot 30 to move horizontally relative to the mounting member 14. Similarly, the hook member 12 includes a second elongate slot 32 through a main body portion of the hook member 12. The second elongate slot 32 also allows for a user-selectable positioning of the securing screw 16 within the second elongate slot 32. In this way, the hook member 12 may be adjusted along a longitudinal direction of the second elongate slot 32 in order to move vertically relative to the mounting member 14.

The first elongate slot 30 and the second elongate slot 32 overlap with respect to each other such that the securing screw 16 goes through both slots. A shank 34 of the securing screw 16 is capable of independent placement at a plurality of positions along each of the first elongate slot 30 and the second elongate slot 32.

In at least one embodiment, a series of notches 36 is provided along an edge of at least one of the first elongate slot 30 or the second elongate slot 32. The series of notches 36 provide available placement of the shank 34 in increments along a length of both the hook member 12 and the mounting member 14. In at least one embodiment, a series of notches are provided at a spacing of about 3.5-4.0 mm. A generally common spacing of the notches 36 is shown between the first elongate slot 30 and the second elongate slot 32. However, it is contemplated that either narrower or wider adjustment increments may be desired in one direction compared to the other direction of adjustment. In an alternative embodiment, a lesser number of notches may be provided at discrete positions along one or more slots, for example at zero, fifty, and one-hundred percent of the total adjustment travel. It is further contemplated that the at least one notch of the elongate slot of the hook member may be configured on either lateral edge of the second elongate slot 32.

The combination of two elongate slots arranged perpendicular relative to each other provides two degrees of freedom of movement of the hook member 12 relative to the mounting member 14. As a result, there is an effective window of placement 38 for the hook feature 20. A user may select to position the shank 34 of the securing screw 16 at any one of the notches 36 along the length of each slot according to desired final location of the hanging article 21. A user may adjust the final location of the hanging article 21 after the hanging assembly 10 has been secured to the mounting surface 24 without removing the mounting member 14. This may be achieved for example by loosening the securing screw 16, changing the placement of the hook member 12, then re-tightening the securing screw 16 where the hook feature 20 is at a new desired position.

The retaining nut 18 is provided with one or more tabs 40 to engage the hook member 12 and the mounting member 14. The tab 40 may abut an outer edge 42 of the hook member 12 while the securing screw 16 is tightened or loosened. The tab 40 also engages an outer edge 44 of the mounting member 14 to restrict rotation of the hook member 12 when the securing screw 16 is rotated. Although the tabs 40 are depicted along a vertical edge 42 of the hook member, it is contemplated that other arrangements may be suitable to inhibit rotation of the hook member 12. For example, a pair of tabs could be positioned horizontally relative to each other and be positioned to both engage an upper edge or a lower edge of the mounting member 14. Alternatively, anti-rotation tabs may be positioned to slidably engage a smooth edge of one or more of the elongated slots.

FIG. 4 shows a first example positioning of the hook feature 20 within the effective window of placement 38. The first example position depicts the shank 34 of the securing screw at a lateral extreme position within the first elongate slot 30. Additionally, the example of FIG. 4 depicts the shank 34 of the securing screw at a lowermost position within the second elongate slot 32. This placement combination within both directions of adjustment results in the hook feature 20 being places at its highest and most lateral position within the window of placement 38.

FIG. 5 depicts a second example placement of the hook feature 20. The shank 34 of the securing screw is placed in an intermediate position along the series of notches 36. In the example, a third incremental position along the first elongate slot 30 is shown. In combination, the shank 34 of the securing screw is depicted at the highest position within the second elongate slot 32. The resulting placement of the hook feature 20 is at the lowest vertical increment, and an intermediate lateral position within the effective window of placement 38. Both degrees of freedom may be used to position the hook at any desired position within the effective window of placement 38.

In at least one alternate embodiment, the orientation of the hook member and mounting member may be reversed. In this way a mounting member may be provided in a generally vertical orientation, and a hook member positioned in a generally horizontal orientation. There may be an advantage in that the mounting member may include mounting pads positioned one above another, such that they could be affixed to a single vertical wall stud. This may provide strength and stability advantages.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A device to hang articles comprising:
    a first member including mounting pads near opposing ends of the first member adapted to be affixed to a mounting surface and an offset surface disposed between the mounting pads, the first member defining a first elongate slot in the offset surface;

a second member defining a second elongate slot and oriented generally perpendicular to the first member, the second member having a hook disposed near an end of the second member;

a threaded screw protruding through the first elongate slot and the second elongate slot; and a retaining nut in engagement with the threaded screw to clamp the first member and the second member thereby securing a relative position between the first member and the second member wherein the retaining nut includes a main body and a pair of tabs extending perpendicularly from the main body to engage both of the first member and the second member to restrict rotation of the second member relative to the first member.

2. The device of claim 1 wherein the elongated slot of at least one of the first member and the second member further defines an edge having at least one notch sized to receive a shank of the threaded screw therein.

3. The device of claim 1 wherein the retaining nut is disposed in a gap between the mounting surface and the offset surface.

4. The device of claim 1 wherein releasing a clamp load between the threaded screw and the retaining nut allows for a relative slip between the first member and the second member such a shank of the screw may be selectively positioned within both of the first elongated slot and the second elongated slot thereby adjusting a position of the hook relative to the first member.

5. The device of claim 1 wherein the retaining nut is disposed on an opposing side of the first and second members from a direction of protrusion of the threaded screw.

6. A device to hang articles comprising:
a generally horizontal first elongate member capable of being affixed to a mounting surface;

a generally vertical second elongate member slidably retained to the first elongate member and having a hook disposed near an end;

a threaded screw protruding through both of the first elongate member and the second elongate member; and a retaining nut in cooperation with the threaded screw and configured to apply a clamp load to restrict relative movement between the first elongate member and the second elongate member, wherein the retaining nut further defines at least one tab configured to engage an outer edge of the first elongate member such that the retaining nut is restricted from rotating when the threaded screw is rotated.

7. The device of claim 6 wherein the second elongate member has two degrees of freedom of movement relative to the first elongate member when the clamp load between the threaded screw and the retaining nut is less than a threshold.

8. The device of claim 6 wherein the first elongate member further defines an offset surface disposed between a pair of mounting pads at opposite ends of the first elongate member such that there is a gap between the offset surface and the mounting surface.

9. The device of claim 8 wherein at least one of the retaining nut and the second elongate member is slidable within the gap between the offset surface and the mounting surface.

10. The device of claim 6 wherein the second elongate member further defines a slot having a series of notches on an edge, and wherein a shank of the threaded screw is capable of being selectively secured in one of the series of notches.

11. The device of claim 6 wherein the retaining nut comprises a main body, and the at least one tab comprises a pair of tabs extending perpendicularly from the main body to restrict rotation of the second elongate member relative to the first elongate member.

12. A device to hang articles comprising:
a mounting member including mounting pads near opposing ends of the mounting member adapted to be affixed to a mounting surface, the mounting member including an offset surface disposed between the mounting pads to define a gap between the offset surface and the mounting surface and a first elongate slot through the offset surface;

a hook member defining a second elongate slot oriented generally perpendicular to, and overlapping the first elongate slot;

a securing screw protruding through both of the first elongate slot and the second elongate slot; and a retaining nut disposed in the gap between the offset surface and the mounting surface, and configured for selective engagement with the securing screw, wherein at least one of the first elongate slot and the second elongate slot further defines an edge having at least one notch sized to receive a shank of the securing screw therein to compressively sandwich both the hook member and the mounting member.

13. The device of claim 12 wherein the at least one notch comprises a series of notches disposed in increments along an edge of at least one of the first elongate slot and the second elongate slot such that the shank may be selectively positioned along the increments.

14. The device of claim 12 wherein the retaining nut further defines a tab configured to engage an outer edge of the mounting member such that the hook member is restricted from rotating when the securing screw is rotated.

15. The device of claim 12 wherein a tightening of the securing screw relative to the retaining nut increases a clamp load thereby restricting relative movement between the mounting member and the hook member, and wherein a loosening of the securing screw relative to the retaining nut decreases the clamp load thereby allowing relative movement between the hook member and the mounting member.

* * * * *